Patented Dec. 2, 1941

2,264,761

UNITED STATES PATENT OFFICE 2,264,761

TREE SPRAY

Hugh Knight, Claremont, Calif., assignor, by mesne assignments, to Shell Development Company, a corporation of Delaware No Drawing. Application May 26, 1938,
Serial No. 210,167

8 Claims. (Cl. 167—43)

This invention relates to a new and improved method of applying insecticidal materials in a finely divided state as suspensoids in water, and in combination with petroleum as emulsions.

The object of this invention is greatly to increase the insecticidal value and efficiency of insecticides that are applied as suspensoids in an aqueous medium, both with or without the addition of petroleum oil.

A further object of this invention is, from a given concentration of the suspensoid in its aqueous medium, greatly to increase the amount deposited on fruit and foliage, and greatly to reduce the amount in the run-off.

A further object is, when oil is used in addition to a suspensoid in the water phase, thus forming an emulsion, to transfer the suspensoid from the water to the oil phase of the emulsion and to deposit the same in oil and not in water.

It is well known that the killing efficiency or toxicity to insects of any insecticide is definitely related to its concentration or to the amount that is deposited per unit area. For example in fumigating with HCN, 20 cc. of liquid HCN per 100 cubic feet has been determined to be the lethal dosage necessary to kill most scale insects of citrus. Recently the lethal dosage of lead arsenate necessary to control the codling moth on apples has been found to be 70 micrograms of lead arsenate (20 micrograms $As_2O_3$) per square centimeter in the Eastern States, and on the Pacific coast 105 micrograms (30 micrograms $As_2O_3$) per square centimeter on fruit and foliage.

When finely divided substances are applied as suspensoids in water to the fruit and foliage of the apple by means of a spray, the deposit per unit area increases in proportion to the increase in amount per 100 gallons of water up to a certain optimum, above this point the increase in deposit falls off. In the case of arsenate of lead this optimum amount or concentration is about 3 pounds to the 100 gallons. At best this deposit is only a minute fraction of the actual amount of lead arsenate in the spray, and what is more important it is far below the known lethal dosage, or deposit necessary to control the insect.

For instance at 3 pounds to the 100 gallons, 50 cc. contains 179,856 micrograms of lead arsenate, if this amount—50 cc., were sprayed evenly over the surface of an apple with an area of 100 square centimeters (diam. 6 cent.), then each square centimeter of surface would hold 1,798 micrograms. In actual practice however, most of this is lost in the run-off, and the actual deposit averages from 35–42 micrograms per square centimeter or from approximately one-third to one-half of the amount known to be the lethal deposit necessary to control codling moth. This is no doubt one of the reasons for the poor results achieved and for the great number of spray applications found to be necessary to keep the codling moth in check, in fact the cost of control is becoming prohibitive so that large acreages of apples are being abandoned.

The use of the usual spreading and wetting agents does not help matters. While a smoother, more even cover is produced, the run-off is heavier and the suspensoid is carried away with it, actually leaving less of the suspensoid deposited over the surface of the fruit than is the case when no spreading agent is used.

When oil is added either as a Knight type soluble (U. S. 1,949,798, 1,949,799, etc.) or as a paste emulsion, the deposit of suspensoid is somewhat increased, but the increase in efficiency is largely attributable to the ovicidal action of the oil. The addition of so-called stickers such as fish oil, etc. increases the deposit but slightly.

I have discovered that by the use of certain depositing agents, hereinafter described, the amount of suspensoid deposited on the surface of the fruit and foliage may be increased from five to ten times or even more, thus making it possible to deposit the insecticide in amounts equalling or exceeding the known lethal density.

When oil is added and emulsified even greater deposit of the suspensoid can be effected if the suspensoid can be transferred from the water to the oil phase of the emulsion, or in other words, can be preferentially wet by oil. This is readily explained when it is remembered that in the first instance 3 pounds of suspensoid are dispersed in 100 gallons of water. Oil is usually added at from ½% to 1%. Assuming 1% to be the amount, then we have 1 gallon of oil to 100 gallons of water and 3 pounds of suspensoid in the water phase. Now if the suspensoid be transferred to the oil phase then 3 pounds becomes suspended in 1 gallon instead of 100 gallons, or in other words, the concentration is increased 100 times.

It has been shown in my co-pending application S. N. 121,044, which has matured into Patent No. 2,190,173 dated Feb. 13, 1940, that under favorable conditions approximately 70% of the oil content may be made to adhere to the surface sprayed. If this oil now carries the suspensoid, it will be deposited with it in greatly increased amounts per unit area. For example, when cryolite was suspended in water at the rate of 3 pounds to the 100 gallons and was sprayed on apples a deposit of 6— micrograms per square centimeter resulted. When 1% of oil containing 1% of my new depositing agent and an oil-soluble emulsifying agent of the class described in my Patent No. 1,949,798 was sprayed on apples—the same amount, 50 cc.—the deposit was increased to 92 micrograms per square centimeter, or over 15 times. Similarly with arsenate of lead, the deposit was increased from 5.5 to 80 micrograms, or over 14 times, and with phenothiazine it was increased over 8 times.

When the depositing agent is used without oil the deposit is increased from 5 to 6 times or more, but the increase is in both instances (with or without oil) more than double the amount of the known lethal deposit or density required to effect a kill.

In my previous patents reference was made to certain properties of the esters of the polyhydroxy alcohols and high molecular weight organic acids. It has since been discovered that they have outstanding properties as wetting and spreading agents for water, as well as oil, producing a smooth even film or cover on the surface sprayed free from drops or spots. They also completely and effectually wet such suspensoids as phenothiazine which is very difficult or even impossible to wet with water alone.

These esters, however, do not ordinarily increase the density of the ensuing deposit when used by themselves. On the contrary, in some instances they tend to diminish the density of the deposit owing to increased run-off. I have discovered that when a small amount of certain organic oil-soluble compounds is dissolved in the above-mentioned esters, they exhibit the peculiar and unique characteristic of greatly increasing the deposit of a suspensoid from the water phase, and when oil is present, the equally unique property of transferring the suspensoid to the oil phase, or of causing it to be wet preferentially by oil. I believe this to be due to electrolytic changes brought about by the inclusion of these compounds.

When oil is present the addition of these compounds will bring about inversion of the emulsion if not checked; this is an additional reason for ascribing electrolytic causes to the phenomenon since inversion is recognized to be electrolytic in nature. To offset this tendency and keep the emulsion in a workable condition (inverted emulsions cannot be sprayed), that is, dispersed throughout the aqueous medium, a restraining agent is introduced. This is preferably a mixture of bentonite and aluminum sulfate 4 parts to 1 part, but other conditioner or restraining agent may be used, as will hereinafter be described. This tends to keep the oil releasing tendency of the emulsion at its highest point, while preventing inversion and in addition provides a smoother more uniform deposit, which is desirable.

The greatly increased deposits made possible by this technique will enable a substantial reduction to be made both in the amount of insecticide used and in the number of applications previously found necessary for effective control, thus greatly reducing the cost to the grower.

The oil-soluble organic compounds which I employ with my esters of high molecular weight organic acids are preferably compounds of the type represented by the following formula: $R-N-(R')_2X$ where R is an alkyl, aryl or aralkyl group; R′ is hydrogen or an alkyl, aryl or aralkyl group, and X is a carboxylic acid, substituted or not, having at least 6 carbon atoms. A preferred example of such compound is:

Mono-amyl-amine-oleate, $C_5H_{11}NH_2COOHC_{17}H_{33}$
Butyl-amine-naphthenate, $C_4H_9NH_2COOHC_6H_{11}$
Ethyl-amine-stearate, $C_2H_5NH_2COOHC_{17}H_{35}$
Methyl-ethyl-amine-oleate, $CH_3C_2H_5NHCOOHC_{17}H_{33}$
Triethyl-amine-oleate, $(C_2H_5)_3NCOOHC_{17}H_{33}$ Naphthenic acid, oil-soluble naphthenates, naphthenic acid esters, sulfonated animal, vegetable, mineral and fish oils, sulfonated naphthenic acids, etc. are also effective as depositing agents, particularly when combined with the substituted ammonia (amine) compounds in the form of alkyl, aryl, or aralkyl amine soaps. As is known the above acids are "soap forming," i. e. their alkali metal or amine salts are soaps having detergent properties.

In practicing my invention I dissolve the depositing agent (an organic oil-soluble compound of the type hereinabove described) in glyceryl oleate or an equivalent ester in proportions of about 1 to 3 to 1 to 20, depending somewhat on the suspensoid to be used and on the particular depositing agent. I have obtained excellent results by dissolving 1 part of mono-amyl-amine-oleate in 5 parts of a glyceryl oleate which is not completely esterified, i. e., which contains a considerable amount of glyceryl di-oleate or glyceryl mono-oleate. Another very effective mixture is 1 part of an amyl amine soap of sulfonated naphthenic acid dissolved in 20 parts of glyceryl oleate.

The liquid combination as hereinabove described is then used at the rate of from 6 to 8 ounces to 100 gallons of water as both wetting and depositing agent. It is introduced into the spray tank by means of an injector situated at any convenient point in the circulatory system. I prefer to use a type of injector operating on the pressure vacuum principle which is merely slipped into place after the spray hose has been detached for filling. This picks up the wetting and depositing agent and/or oil under the full pressure of the pump (400 to 500 lbs.) and delivers the same fully emulsified into the tank. A suitable formula is as follows:

| | | |
|---|---|---|
| Arsenate of lead | lbs. | 3 |
| Depositing agent mixture | ounces | 8 |
| Water | gallons | 100 |

When oil is used the depositing-agent mixture is dissolved in the oil at from 3% to 5% by volume, it is then introduced into the spray tank (preferably by means of the injector). The oil is preferably a refined petroleum oil from which phytocidal components have been removed by acid treating, solvent extraction, or other refinery methods and it is usually characterized by a Saybolt viscosity at 100° F. of about 40 to 100 seconds. The unsulfonatable residue usually ranges from about 70 to 100, depending somewhat upon the type of foliage, kind of parasite, climatic conditions, etc. A preferred oil is a technical white oil having an unsulfonatable residue of about 90% and a viscosity of about 70 seconds Saybolt at 100° F. A suitable formula for an oil spray is as follows:

| | Per cent |
|---|---|
| Technical white oil | 95.0 |
| Glyceryl mono- and di-oleates | 2.5 |
| Mono-amyl-amine-oleate | .5 |
| Aluminum oleate | 2.0 |
| Total | 100.0 |

Each gallon of the above oil may be emulsified in 50 to 200 gallons of water; for most purposes a 1% oil concentration is preferred. The oil is usually introduced into the tank of the spray ring through the injector. The insecticide used with the above spray may be of any conventional type such as lead arsenate, cryolite, phenothiazine, etc., and is preferably employed at the rate of about 1 to 3 pounds per gallon of oil. The insecticide is preferably introduced directly to the spray tank. Care should be taken to prevent agglomeration and to insure thorough and intimate mixing.

As hereinabove stated, my preferred depositing agent is a mixture of an ester of a polyhydroxy alcohol and a high molecular weight organic acid with a substituted amine soap. I have found that soaps made from sulfonated oils and sulfonated naphthenic acid are much more effective than ordinary naphthenates, oleates, stearates, etc. Sulfonated mineral oils, or more particularly sulfonated animal or vegetable oils such as sulfonated castor oil, may be used in some instances without the ammonia or amine compound, using about 1 part of sulfonated oil or sulfonated oil soap to 5 parts of glyceryl mono-oleate. One part of sulfonated naphthenic acid may be mixed with 10 parts of glyceryl mono-oleate to give a depositing agent which has desirable properties. If these sulfonated oils or sulfonated naphthenic acids are treated with the alkyl amines, the resultant soaps are effective when used in the proportion of 1 part of soap to 20 parts of glyceryl mono-oleate.

I have found that with many insecticides it is necessary to employ a restraining agent to avoid the inversion of the oil-in-water emulsions. I prefer to employ bentonite or a bentonite mixture for this purpose, a preferred example being 4 parts of bentonite and 1 part aluminum sulfate. Where the spray composition contains other polyvalent cations, such as aluminum oleate, the aluminum sulfate may be omitted, but for most purposes I find that a small amount of it is beneficial. I employ about ¼ to 1 pound of bentonite per 100 gallons of oil-in-water emulsion. The bentonite may be mixed with the insecticide prior to the introduction of the latter into the mixing line of the spray ring. Alternatively, the bentonite may be added directly to the water, if suitable care is taken to insure thorough mixing.

The function of the bentonite is particularly important when insecticides are suspended in oil-in-water emulsions, but the bentonite also serves a useful purpose in simple aqueous sprays, particularly when nicotine is employed as the insecticide.

Another example of my improved spray oil is as follows:

| | Per cent |
|---|---|
| Light mineral spray oil | 96.0 |
| Glyceryl oleate | 2.0 |
| Aluminum oleate | 1.5 |
| Sulfonated naphthenic acid | 0.5 |
| Total | 100.0 |

The above soluble oil is emulsified in 100 gallons of water with the addition of ½ to 1 pound of bentonite and 3 pounds of lead arsenate, cryolite, or other specific insecticidal material. The sulfonated naphthenic acid supplements the glyceryl oleate, transferring the insecticide to the oil phase and depositing this insecticide in amounts far in excess of those required for a lethal dosage. The bentonite prevents emulsion difficulties and brings about a flocculent structure which prevents oil from settling out, holds the insecticide in the dispersed phase with the oil and improves the deposit when applied to plant leaves.

Bentonite is particularly useful when nicotine is employed as an insecticide, either in oil-soluble or water-soluble form because the bentonite appears to prevent the loss of nicotine with the run-off water or "drips." When nicotine or any other toxic material is used which has the property of being adsorbed, absorbed or otherwise combined with the bentonite, the bentonite may be employed in larger quantities than would be otherwise indicated. In such cases the amount of bentonite may be roughly equivalent to the amount of lead arsenate, cryolite, etc., as set forth in the previous examples. With a 5% solution of nicotine naphthenate I may use from 2 to 5 pounds of bentonite per 100 gallons. Little or no aluminum sulfate is required with this bentonite and in any case, from 2 to 3 ounces per 100 gallons is sufficient. A preferred material for use with nicotine consists substantially of:

| | Parts |
|---|---|
| Bentonite | 9 |
| Fullers earth | 9 |
| Aluminum sulfate | 2 | this mixture being applied at 3 to 5 pounds per 100 gallons of spray.

A formula employing a sulfonated oil depositing agent is:

| | Per cent |
|---|---|
| Technical white oil | 97.0 |
| Glyceryl-mono-oleate | 2.5 |
| Sulfonated castor oil | .5 |

This soluble oil concentrate may be used to deposit normally solid insecticide material and may be supplemented by the use of bentonite or bentonite aluminum sulfate mixtures.

The particular formula for any particular purpose will depend on the nature of the insects or parasites, the hardihood of the host, the climatic conditions, etc., but any one skilled in the art can practice the invention by following the teachings hereinabove set forth.

The addition of about 5 to 25% of an organic ammonia compound (preferably a soap) to an ester of a polyhydroxy alcohol and a high molecular weight organic acid will give a depositing agent which is extremely effective for both aqueous sprays (containing no oil) and oil-in-water sprays. In aqueous sprays this depositing agent should be used in amounts of about 4 to 12 ounces per 100 gallons of water and per 1 to 4, preferably 3, pounds of insecticide. I prefer to use about 3 pounds of insecticide per 100 gallons of water when the insecticide is lead arsenate, cryolite and the like. When oil is used, the depositing agent should constitute about 3% to 5% by volume of oil. The restrainer, such as bentonite or bentonite aluminum sulfate mixture, should be in amounts of about ¼ to 1 pound per 100 gallons of spray.

Although I have described my invention in considerable detail, it should be understood that I do not limit myself to any of these details, except as defined by the following claims which should be construed as broadly as the prior art will permit.

I claim:

1. The method of increasing the deposit of an insecticide from the oil phase of an oil-in-water emulsion containing said insecticide, comprising spraying said emulsion which in addition to oil, water and insecticide contains small amounts of each of the following substances: an oil soluble hydroxy ester of a high molecular weight fatty acid with a polyhydroxy alcohol; an oil soluble organic compound comprising a salt combining a lower alkyl hydrocarbon amine with a fatty acid; and a restraining agent comprising bentonite for preventing inversion of said emulsion, the amount of said restraining agent being adapted to prevent inversion of said emulsion.

2. An improved insecticidal spray oil comprising an oil-in-water emulsion containing an insecticide, and further containing small amounts of each of the following substances: an oil soluble hydroxy ester of a high molecular weight organic acid with a polyhydroxy alcohol; an oil soluble fatty compound comprising a salt combining a lower alkyl hydrocarbon amine with a fatty acid; and a restraining agent comprising bentonite for preventing inversion of said emulsion, the amount of said restraining agent being adapted to prevent inversion of said emulsion.

3. The spray oil of claim 2 in which the polyhydroxy alcohol is glycerine.

4. The spray oil of claim 2 in which the fatty acid is oleic acid.

5. The spray oil of claim 2 in which said salt is monoamylamine oleate.

6. The spray oil of claim 2 in which the restraining agent is a mixture of bentonite and aluminum sulfate.

7. The spray oil of claim 2 in which the restraining agent is a mixture of bentonite and aluminum sulfate in the approximate proportions of 4:1.

8. The spray oil of claim 2 in which said oil soluble organic compound amounts to 3-5% by volume of the oil contained in said emulsion.

HUGH KNIGHT.